United States Patent [19]
Eichelberger et al.

[11] Patent Number: 4,531,551
[45] Date of Patent: Jul. 30, 1985

[54] DOUBLE-WALLED, FLEXIBLE HOSE

[75] Inventors: Leo Eichelberger, Ruesselsheim; Hans-Joachim Ciszewski, Einhausen, both of Fed. Rep. of Germany

[73] Assignee: Siemens Aktiengesellschaft, Berlin and Munich, Fed. Rep. of Germany

[21] Appl. No.: 559,769

[22] Filed: Dec. 9, 1983

[30] Foreign Application Priority Data

Dec. 14, 1982 [DE] Fed. Rep. of Germany ....... 3246247

[51] Int. Cl.³ .............................................. F16L 9/16
[52] U.S. Cl. .................................... 138/129; 138/148; 138/154; 174/47
[58] Field of Search ............... 138/111, 115, 121, 122, 138/129, 144, 148, 154; 174/47

[56] References Cited

U.S. PATENT DOCUMENTS

| | | |
|---|---|---|
| 3,297,055 | 1/1967 | Beck . |
| 3,495,628 | 2/1970 | Boender ........................ 138/148 X |
| 3,811,478 | 5/1974 | Ahlquist ........................ 138/129 X |
| 4,354,051 | 10/1982 | Kutnyak ........................ 138/129 X |

FOREIGN PATENT DOCUMENTS

| | | |
|---|---|---|
| 239019 | 3/1965 | Austria . |
| 565111 | 3/1958 | Belgium . |
| 39495 | 11/1981 | European Pat. Off. . |
| 8012326 | 5/1981 | Fed. Rep. of Germany . |
| 737033 | 9/1932 | France . |
| 2040013 | 8/1980 | United Kingdom . |

Primary Examiner—James E. Bryant, III
Attorney, Agent, or Firm—Hill, Van Santen, Steadman & Simpson

[57] ABSTRACT

An improved double wall hose and the method of forming the hose characterized by the hose comprising a helically wound member having a center part with extensions extending in opposite directions so that when adjacent turns of the member are joined together, a plurality of cavities are formed with one of the cavities containing a helical reinforcing member. Preferably, the reinforcement is of a material harder than the material forming the rest of the member and the turns of the member when joined together provide smooth continuous inner and outer wall surfaces for the hose.

18 Claims, 7 Drawing Figures

DOUBLE-WALLED, FLEXIBLE HOSE

BACKGROUND OF THE INVENTION

The present invention is directed to a double wall, flexible hose which has an inside wall surface spaced from an outside wall surface with a helical reinforcement with axial spacing between the turns being positioned in a cavity between the walls and to the method of manufacturing the hose.

Hoses that are provided with armoring or support helixes in order to prevent the hose for collapsing are frequently employed for suction and/or partial vacuum systems. Such hose designs are in fact light and flexible. However, the undulatory outside contour caused by the supporting helix is disadvantageous and raises problems with respect to cleanliness. This is especially true in the areas of special hygienic demands, for example, in the medical field. It is difficult, if not even impossible, to keep an undulatory surface faultlessly clean on a permanent basis.

In order to overcome these drawbacks, attempts have already been undertaken as disclosed in Austrian Letters Pat. No. 239019. As disclosed, the hose is provided with a smooth wall on the inside wall surface and the outside is provided with a cover hose such as a second outside skin that has been extruded or, respectively, drawn over the undulatory outer contour of the inside hose structure. While largely retaining the flexibility, a relatively smooth outer contour can in fact be achieved with such a hose reinforcement. However, such a construction for a hose continues to exhibit the slightly undulatory contours typically given such helical hoses together with the aforementioned disadvantages of poor cleanability and hygienics of the surface.

A hose design is also disclosed in German GM 8012326 wherein inner and outer continuous hose jackets or sleeves are disposed concentric to each other and spaced apart by a reinforcing helix which is connected between the two hose jackets. This hose design is difficult to manufacture insofar as the hose consists of individual components comprising the inside sleeve, a helix and an outside sleeve that must be separately manufactured and connected to one another. This produces an extensive and expensive apparatus outlay. In addition, a good, mutual connection of the individual components is very difficult due to the chronological and special staggered manufacturing process of the individual components. The contour of the outer hose is also slightly undulatory in this instance in order to still be able to achieve a relatively good flexibility given the relatively short intervals and axial directions between the turns of the support helix.

A synthetic pipe, which is principally designed for underground installation as well as a method for manufacturing this pipe, is disclosed in Belgian Pat. No. 565101. In this patent, a synthetic pipe is manufactured by means of helically wrapping one or more tapes of semifluid yet relatively stiff material. Internally disposed, helically extending cavities that lend the respective rigid pipe a certain flexibility, are created by means of the wrapping of the tapes. The pipe thus remains stable in shape given external acting loads such as from the earth surrounding the hose or pie, but is somewhat yielding within narrow limits. In order to make the pipe more resistant to pressure and radial expansion, the cavities can either be filled with air which means that the air chambers must be closed or with a material that is even stiffer in comparison to the material of the tapes of the pipe, for example, asbestos, cement or polyester fiberglas or the like.

SUMMARY OF THE INVENTION

The present invention does not relate to a plastic pipe and is not concerned with the manufacture of such a pipe. On the contrary, it is directed to an improvement in the hitherto known flexible hose design which design avoids the initially discussed disadvantages and exhibits optimal surfaces both on the inside as well as the outside and retains a high flexibility and support function. In addition, the improved design is easy to manufacture in terms of production engineering than the designs which are hitherto known.

To accomplish these goals, the present invention is directed to an improvement in a hose with an inside wall surface spaced from an outside wall surface to provide a flexible double wall hose with a helical reinforcement with axial spacing between the turns being positioned in a cavity between the walls. The improvement comprises the hose being constructed of a helically extending member having a cross-sectional profile containing a center part with an inside surface extending parallel to an outside surface, the center part having a thickness between said inside and outside surfaces corresponding to the thickness of the double wall of the base, said outside surface having a first extension and the inside surface having a second extension, said first and second extensions proceeding in opposite directions from the center part and forming extended surfaces for the inside and outside surfaces, said member being helically wound into a hose with the first and second extensions engaging opposite turns of the member to form a continuously smooth outside wall surface and a continuously smooth inside wall surface, said first and second extensions and said center part providing separate cavities, said reinforcement being disposed in one of the cavities, and the helical member being composed of a soft material while the reinforcement comprises a material harder than the material of the helical member and less flexible. The method comprises extruding the helical member; winding the helical member into a hose and joining the outer surfaces of the extensions to adjacent turns to form a smooth continuous outside wall surface and a smooth continuous inside wall surface with cavities extending therebetween, and providing a helically extending reinforcement in one of the cavities of the member, said reinforcement being of a harder material than the material of the member.

The hose of the present invention is distinguished by the following advantages. It has both smooth inside and outside wall surfaces. It has a highly flexible and sufficient support function due to employment on the one hand of a soft material for the wound member and on the other hand because of a reinforcement material, which is harder in comparison to the soft material of the member, is placed in one of the cavities of the member with the width of the cavity free of reinforcement material being equal to or greater than the width of the reinforcement material which is wound in the helix. The hose is simple to manufacture in terms of production engineering by means of winding a coextruded profile or member.

The profile of the member which is produced by a coextrusion method can be wound into a hose while in a plastic condition. The member is designed so that the cavities will be produced in the hose wall during the winding process. These cavities can be prevented from collapsing during the winding process with the assistance of, for example, a supporting air pressure. The cavities are expediently tight as viewed in the radial direction so that they can be advantageously employed for conducting flowing liquid or gaseous agents. Beyond this, the cavities can also be utilized for the guidance of various lines and cables.

BRIEF DESCRIPTION OF THE DRAWINGS

FIGS. 3-7 are similar to FIG. 2 showing different embodiments with FIG. 3 showing a first embodiment; FIG. 4 showing a second embodiment; FIG. 5 showing a third embodiment; FIG. 6 showing a fourth embodiment and FIG. 7 showing a fifth embodiment.

DESCRIPTION OF THE PREFERRED EMBODIMENTS

Figure 1:
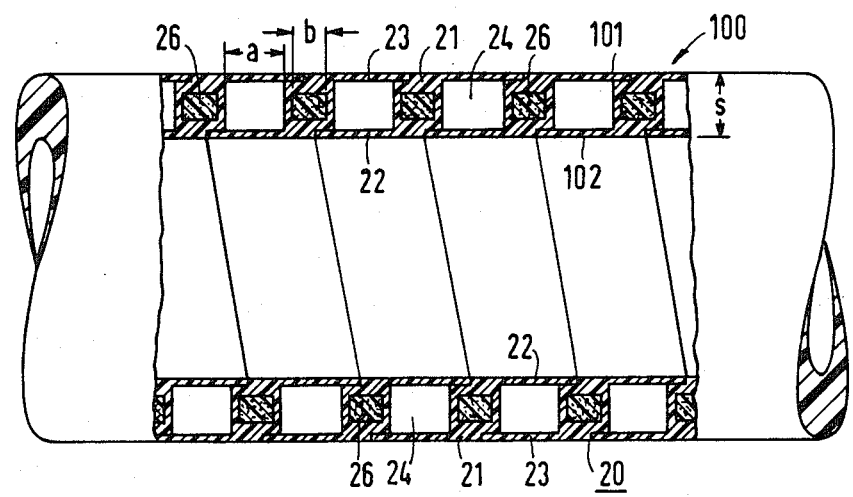
FIG. 1 is a side view of a hose in accordance with the present invention with a portion broken out to provide a longitudinal cross-section thereof.

The principles of the present invention are particularly useful in a hose generally indicated at 100 in FIG. 1, which hose extends between a source of suction or pressure and a dental apparatus. The hose 100 has a smooth outer wall surface 101 and a smooth inner wall surface 102 which extend parallel to each other to form a double wall configuration. As illustrated, the hose 100 is formed by a helically wound member 20 which has adjacent turns interconnected and joined together to form the continuous wall surfaces 101 and 102.

Figure 2:
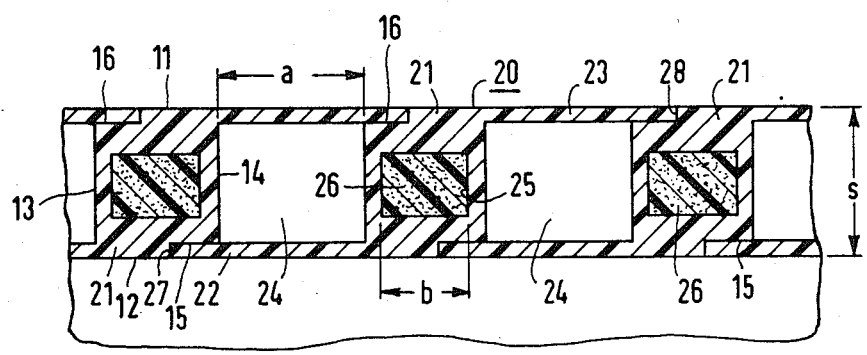
FIG. 2 is an enlarged partial cross-sectional view of the hose of FIG. 1 to show in greater detail the wound member forming the hose.

As best illustrated in FIG. 2, the member 20 has a cross-sectional profile which has a S shape. The member 20 has a center part 21 with parallel extending surfaces 11 and 12 and sides 13 and 14. Extending from the center part 21, the member 20 has a first extension or outer stay 23 whose outer surface is a continuation of the surface 11 and a second extension or inner stay 22 whose outer surface is a continuation of the surface 12. As illustrated, the extensions 22 and 23 extend in opposite directions to provide the "S shaped cross-section". Thus, the extensions 22 and 23 form connecting parts or stays for interconnecting adjacent turns of the helically wound member 20. As illustrated, the extension 22 extends from a portion of the slide wall 13 while the extension 23 extends from a portion of the side wall 14. The parallel surface 12 adjacent the side wall 14 has a longitudinally extending groove or recess 15 which is the same depth as the thickness of the extension 22. In a similar manner, the surface 11 adjacent the side 13 has a stepped portion formed by a recess or groove 16 which has a thickness equal to the extension 23. The member 20 is wound so that the specific length or the extensions or stays 22 are engaged in the grooves 15 of the adjacent turns and the end of the extension 23 is engaged in the groove 16. Thus, the extensions 22 and 23 overlap a portion of the adjacent center part 21 of the adjacent turn. Because of the recess or grooves 16 and 15, the extensions such as 22 are flush with the adjacent surface 11 to form the smooth continuous interior wall surface 102 and the outer surface of the extensions 23 received in the grooves 16 form a smooth outer wall surface 101 for the hose 100.

When assembled, the extensions 22 and 23 of adjacent turns coact to form a cavity 24. The combination with a relatively thin wall thickness is exhibited by the extensions 22 and 23, this cavity will produce the required flexibility on the one hand and on the other hand can also be employed for conducting cables or fluid-type agents. In order to obtain optimum flexibility, the extensions preferably a have a total wall thickness of approximately 0.2×s, wherein s is the wall thickness of the hose 100. The member 20 contains a separate reinforcement in the form of a support helix 26 which is disposed in a cavity 25 that was formed in the center part 21. This reinforcement 26 preferably consists of an elastomer or, respectively, a thermoplastic material of the same species as the material used to form the member 20 but a material which is harder than the material used for the member 20. The width a of the cavity 24 which is formed by the extensions and is taken in a longitudinal direction of the hose 100, has a ratio to a width b of the reinforcement 26 of at least 1:1. Preferably, the width a is equal to or greater than the width b. The connection of the profile stays formed by the extensions 22 and 23 have their ends 27 and 28 secured in the grooves 15 and 16, respectively. This connection can be formed by means of bonding using hot air or the like to heat-seal the turns together. In addition, the turns can be secured together by a glue or adhesive.

Figure 3:
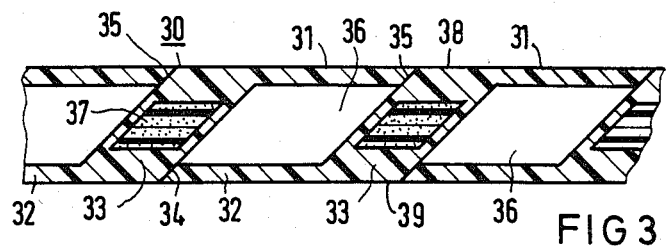

In FIG. 3, an embodiment of the helical member is illustrated by the member 30. The member 30 has a center part 33 with stays or extensions 31 and 32 extending therefrom. As in the previous embodiment, a first extension 31 has an outer surface which is a continuation of an outer surface 38 of the center part 33 while the second extension 32 has an outer surface forming a continuation of a surface 39 and extends parallel to the surface 38. As illustrated, the center part 33 has a cross-section of a parallelogram and the slanting side surfaces 35 and 34 are provided. The extensions 31 and 32 are connected to the adjacent center parts 33 with end surfaces which are at the same angle as the surfaces 34 and 35 to form a cavity 36 between the two extensions and the adjacent center parts 33. As in the previous embodiment, the center part has a cavity receiving a reinforcement 37. The cross-section of the cavity receiving the reinforcement 37 as well as the cavity 36 are of parallelograms and the reinforcement has the cross-sectional shape of a rhombus.

Figure 4:
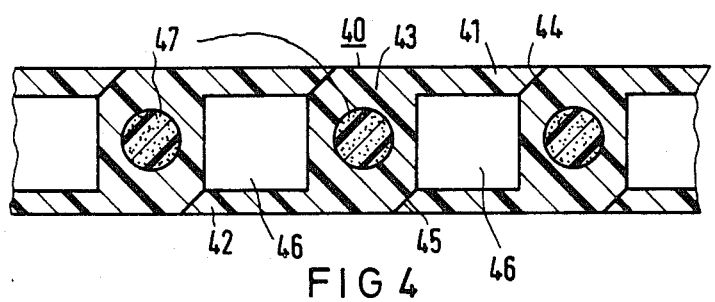

Another embodiment of the helical member is illustrated by a helical member 40 in FIG. 4. The member 40 has a first extension 41 and a second extension 42 which extend outward from a center part 43. The center part 43 has a rectangular configuration except for corners opposite the extensions such as corners 45 and 44 being cut off to form oblique surface segments. Each of the extensions 41 and 42 have a correspondingly-shaped end surface so that when the member 40 is wound into the helix and the extensions 41 and 42 are joined to adjacent surfaces 44 and 45, a smooth continuous outer wall surface and a smooth continuous inner wall surface is provided for the hose and a helical cavity 46 is formed. As in the previous embodiments, the center part 43 has a cavity containing a reinforcement 47; however, it has a round or oval cross-section in the embodiment of FIG. 4.

Figure 5:
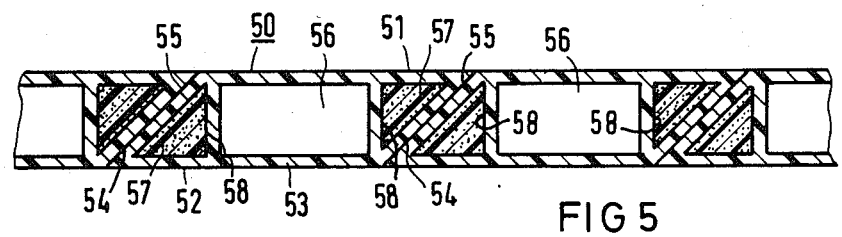

Another embodiment of the helically wound member is illustrated by the member 50 in FIG. 5. The member 50 has extensions 51 and 52, which extend from a center part 53 and each have a triangular cross-section. The center part 53 has a hollow cavity 56 while each of the extensions 51 and 52 have a triangular cavity 58 filled with a reinforcing material 57. Each of the triangular extensions 51 and 52 have a thickness equal to the entire thickness of the center part 53 and terminate with the first extension 51 providing an extension of an outer smooth wall of the center part 53 while the second extension 52 provides a smooth extension of the walls or surface of the center part 53. The extension 51 has a slanting surface 54 which matches a slanting surface 55 of the extension 52 so that when the member is wound into the helical form, the surfaces 54 and 55 mate and can be secured together to complete the form of the hose. The cavity 56 unlike the cavities in the center parts 21, 33 and 43 of the previous embodiments is free of reinforcement and can be utilized as illustrated, to conduct fluids without reinforcements or can have a partial reinforcement and also conduct fluid. An advantage of the construction of this member 50 is that the reinforcement 57 in the extensions 51, 52 are on both sides of the cavity 56 and that joining of the oblique contacting surfaces 54, 55 insures the area of this reinforcement. The contact pressure required when joining the turns does not lead to any deformation of the profile with this structure.

Figure 6:
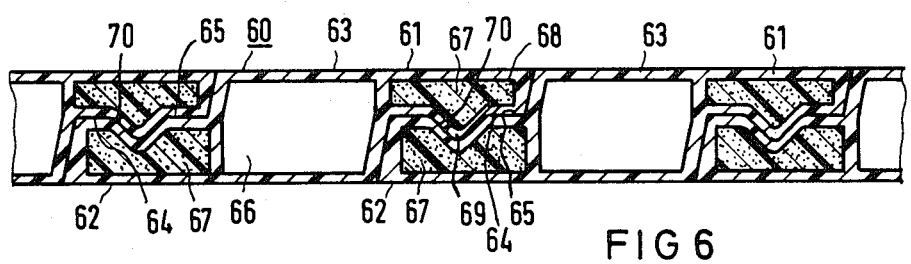

Another embodiment of the helical member is illustrated by the member 60 in FIG. 6. The member 60 also has a center part 63 which has a cavity 66. Extending from the member 63 is a first extension 61 and a second extension 62. Each of the extensions 61 and 62 has a cavity 68 receiving a support helix such as 67. The extensions 61 and 62 have joining surfaces 64 and 65 respectively. As illustrated, the joining surface 64 has a projection 69 which extends into a recess 70 in the surface 65 so that good positioning of the extensions and restraint therebetween is provided during the winding operation of the individual turns. Thus, the extensions coact with the outer surfaces of the center part 63 to form continuous smooth outer and inner wall surfaces for a hose. The cavity 66 is illustrated as receiving lines and cables 110 or the like.

The cavities, which are not employed for reinforcement, can be stiffened by being filled with a soft, elastic material preferably a foam. This foam is introduced into the cavity during the extruding operation. It is also conceivable to subsequently fill the cavities with a foam if desired.

The hose 100 is not restricted to the structural type illustrated by the members 20, 30, 40, 50 and 60 but on the contrary, the members can have further modifications which are within the framework of the principles of the present invention. For example, in the illustrated embodiments, the center parts of the embodiments of FIGS. 2-6 only contain a single cavity however these center parts could be constructed like member 120 of FIG. 7 with a center portion 71 of a plurality of center chambers 72 and 73 whose partition wall 74 forms the reinforcement and thus provide the required stiffness. Both the reinforcement as well as the elasticity can be influenced by the material which is disposed in the cavity. Thus, when two or more cavities are provided, it can thus be advantageous to fill the one cavity with a relatively hard material suited to provide the support function such as a steel helix 75 in an extreme case and in contrast to fill the other cavities with relatively soft elastic material, for example, with foam 76.

Although various minor modifications may be suggested by those versed in the art, it should be understood that we wish to embody within the scope of the patent granted hereon, all such modifications as reasonably and properly come within the scope of our contribution to the art.

We claim:

1. In a hose having an inside wall surface spaced from an outside wall surface to provide a flexible double wall hose with a helical reinforcement with axial spacing between the turns being positioned in a cavity between the walls, the improvement comprising the hose being constructed of a helically extending member having a cross-sectional profile containing a center part with an inside surface extending parallel to an outside surface, the center part having a thickness between said inside and outside surfaces corresponding to the thickness of the double wall of the hose, said outside surface having a first extension and the inside surface having a second extension, said first and second extensions proceeding in opposite directions from the center part and forming extended surfaces for the inside and outside surfaces, said member being helically wound into a hose with the first and second extensions engaging opposite turns of the member to form a continuously smooth outside wall surface and a continuously smooth inside wall surface, said center part and the extensions providing separate cavities when the turns of the member are secured together to form the hose, said reinforcement being disposed in one of the cavities and the helical member being composed of a soft material while the reinforcement comprises a material harder than the material of the helical member and less flexible.

2. In a hose according to claim 1, wherein a $\asymp$ profile is provided as the cross-section of the helical member, said center part having cavities and said two extensions coacting to form additional cavities when the adjacent turns are joined together.

3. In a hose according to claim 1, wherein each of the extensions contain a cavity.

4. In a hose according to claim 3, wherein each of the extensions has a triangular cross-section with one side forming a side of the center part, said extensions of adjacent turns being interconnected by a shared common surface.

5. In a hose according to claim 3, wherein one of the extensions has a surface with a projection extending the length of the extension and the other extension has a surface with a recess for receiving the projection during the winding operation.

6. In a hose according to claim 1, wherein the width of the cavity free of any reinforcement is $\geqq$ width of the reinforcements.

7. In a hose according to claim 1, wherein each of the first and second extensions is a solid strip-like member and the total thickness of the strips forming the two extensions is equal to approximately $0.2 \times s$, wherein s is the wall thickness of the hose.

8. In a hose according to claim 1, wherein each of the extensions overlap a portion of the center part.

9. In a hose according to claim 8, wherein the center part has a recess for receiving each of the overlapping portion of each extension.

10. In a hose according to claim 8, wherein each of the extensions terminates in an obliquely extending surface and the center part has a corresponding obliquely extending surface for engaging each of the obliquely extending surfaces of the adjacent extensions.

11. In a hose according to claim 1, wherein each of the individual extensions has an oblique connecting surface engaging a corresponding surface.

12. In a hose according to claim 1, wherein at least one of the cavities of each of the members is provided with a reinforcement.

13. In a hose according to claim 1, wherein the reinforcement is formed by means of a foam filling of the appertaining cavity.

14. In a hose according to claim 1, wherein cavities not utilized for receiving a reinforcement are filled with a soft elastic material, preferably with foam.

15. In a hose according to claim 1, wherein cavities not utilized for receiving reinforcements are utilized for receiving lines and cables or the like.

16. In a hose according to claim 1, wherein cavities not utilized for reinforcement are closed and sealed in a radial direction and are utilized for conducting a liquid agent.

17. In a hose according to claim 1, wherein the hose is utilized as a suction and pressure hose for a dental apparatus.

18. In a hose according to claim 1, wherein each of the extensions have a strip shape and the extensions of adjacent turns coact to form a cavity therebetween.

* * * * *